US007343463B2

(12) United States Patent
Kakihara et al.

(10) Patent No.: US 7,343,463 B2
(45) Date of Patent: Mar. 11, 2008

(54) DATA STORAGE UNIT, EXECUTABLE COMMAND SELECTION METHOD, AND DATA PROCESSING METHOD

(75) Inventors: Toshio Kakihara, Fujisawa (JP); Hiromi Nishimiya, Yamato (JP); Tomoyuki Oyama, Fujisawa (JP); Akinori Yuba, Fujisawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 478 days.

(21) Appl. No.: 10/417,405

(22) Filed: Apr. 15, 2003

(65) Prior Publication Data

US 2004/0210711 A1    Oct. 21, 2004

(30) Foreign Application Priority Data

Apr. 12, 2002    (JP)    ............................. 2002-110702

(51) Int. Cl.
    *G06F 12/00*    (2006.01)
(52) U.S. Cl. ........................................ 711/167; 711/112
(58) Field of Classification Search ................ 711/111, 711/112, 113, 165
    See application file for complete search history.

(56) References Cited

U.S. PATENT DOCUMENTS 5,991,825 A *  11/1999  Ng ................................ 710/6

| 6,311,256 B2 * | 10/2001 | Halligan et al. ............ 711/158 |
| 6,553,454 B1 | 4/2003 | Harada ........................ 711/111 |
| 6,681,289 B2 * | 1/2004 | Espeseth et al. ............ 711/112 |
| 6,898,665 B1 * | 5/2005 | Megiddo ..................... 711/113 |
| 2004/0019749 A1 * | 1/2004 | Mochida et al. ............ 711/151 |

FOREIGN PATENT DOCUMENTS

| JP | 2001-034423 | 7/1999 |
| JP | 2003-316523 | 4/2002 |

OTHER PUBLICATIONS

"Computer Dictionary", © 1994 Microsoft Press, p. 14.*
Foltz et al., "Splitting the Scheduling Headache", © 2000 IEEE, p. 489.*
Coffey et al., "Information Retrieval From Database", © 1994 IEEE, p. 170.*

* cited by examiner

*Primary Examiner*—Brian R. Peugh
(74) *Attorney, Agent, or Firm*—Kunzler & McKenzie

(57) ABSTRACT

An executable command selection system and method are provided. A command is selected as the next-to-be-executed command when the execution waiting time for the command is less than or equal to a predetermined reference time. In addition, the command selected as the next-to-be-executed command has an execution waiting time greater than or equal to a scanning time. Once a command is selected as the next-to-be-executed command, calculation of execution waiting times for subsequent commands in the command queue stops. In this manner, when the number of commands in the command queue exceeds a predetermined number, the method of the present invention improves the efficiency of command execution for a storage device.

25 Claims, 11 Drawing Sheets

DATA STORAGE UNIT, EXECUTABLE COMMAND SELECTION METHOD, AND DATA PROCESSING METHOD

BACKGROUND OF THE INVENTION

1. The Field of the Invention

The present invention relates to a data storage unit represented by a hard disk drive (HDD) and, more particularly, to a method of selecting a next-to-be-executed command from among write or read commands.

2. The Relevant Art

An HDD is one of the most popular external storages used for a computer. The HDD has a magnetic head for reading data stored in a magnetic disk and for writing data into the magnetic disk. The magnetic head is held on an actuator mechanism which is swung by a voice coil motor (VCM). In order for the magnetic head to perform a data read or write operation, the magnetic head is moved and positioned to (seeks) a predetermined track on the magnetic disk by driving the actuator mechanism. The track includes a plurality of sectors, each of which is a minimum unit for data storage. The magnetic head is controlled to move to a predetermined location with the assistance of servo information stored on the magnetic disk.

A write command and a read command (both of which are hereinafter generally referred to as a command) issued from the computer to the HDD are held (queued) in a command queue (hereinafter simply referred to as a queue) in the HDD. A plurality of commands held in the queue are ordered for execution. For a write command, the term "execution" used herein refers to an operation for writing data contained in the write command to a predetermined location on a magnetic disk through a magnetic head. For a read command, it refers to an operation for reading data from a predetermined location on the magnetic disk through the magnetic head. A command execution order is determined according to a technique. In this technique, only one command is selected from all commands held in the queue, based on seek times (the times from the beginning of seek for target tracks on the magnetic disk to the arrival at the target tracks) and disk latency times (the times from the arrival to the beginning of accessing the target sectors), so that the selected command specifies a start sector which is accessible by the shortest time period from the end sector specified by the last selected command. This technique is intended to improve the performance of read and write operations on an HDD.

The above-mentioned technique is suitable to ensure the selection of an executable command in a minimum time. However, this technique may suffer from some problems as described below when a queue holds many commands (which is hereinafter expressed as a "deep queue"). According to the prior command selection method described above, a seek time (the time from the beginning of a seek to a target track on a magnetic disk to the arrival at that track) and a disk latency time (the time from the arrival to the beginning of access to the target sector) are calculated (scanned) for all commands held in a queue. Therefore, in the prior technique there may be a rotational wait because it is not possible to select a command with an execution waiting time shorter than the time required for this scanning. There may also be a rotational wait when there is not a sufficient time to scan all commands. Most modern HDDs can hold 64 or more commands in a queue and thus, the deeper queue may bring about more significant performance degradation due to the above-mentioned problems.

It is, therefore, an object of the present invention to provide an executable command selection method which can improve the performance for deeper queues as compared with the prior technique. It is another object of the present invention to provide a data storage unit to which the executable command selection method is applicable. It is still another object of the present invention to provide a data processing method to which the executable command selection method is applicable.

BRIEF SUMMARY OF THE INVENTION

The following description will first deal with reordering according to the prior technique for queue depths of 8 and 64 and then proceed to reordering according to the present invention. It is assumed that latency times for different commands vary on average and seek times are sufficiently short. It is also assumed that it takes a $1/128$ turn to scan a command in a queue. For this purpose, the expression "$1/128$ turn" means that it is equal to $1/128$ of a time for a magnetic disk to rotate a turn.

As shown in the column "Before reorder" in FIG. 3, it is assumed that a queue holds eight commands C1 to C8. In this queue, the commands C1 to C8 are held in order of issue from a computer. The time during which each of the commands C1 to C8 waits for execution (execution waiting time) is shown in the corresponding row in FIG. 3. The prior technique calculates the execution waiting times of all the commands C1 to C8 before selecting a command to be executed. Therefore, the time required to scan the eight commands C1 to C8 is equal to $8 \times 1/128$ turn = $1/16$ turn.

FIG. 4 is a bar graph for showing the execution waiting times of the commands C1 to C8. In the figure, the time required to scan the eight commands C1 to C8 ($1/16$ turn) is also shown. Since a command with an execution waiting time shorter than the scanning time cannot be selected, a command with an execution waiting time which is equal to or longer than the scanning time and the shortest among all the commands is suitable as a next-to-be-executed command. As is clear from FIG. 4, the command C4 with the execution waiting time of a $1/8$ turn will be selected as the next-to-be-executed command. Therefore, among the commands in the queue, the command C4 will be placed on the top of the queue as the next-to-be-executed command as shown in the column "After reordering" of FIG. 3.

By way of example, the case where eight commands are held in a queue has been described above and another case where 64 commands are held in a queue will be described below with reference to FIGS. 5 and 6.

As shown in FIG. 5, it is assumed that a queue holds 64 commands C1 to C64 before reordering. The execution waiting time of each command is as shown in the figure. The prior technique calculates the execution waiting times of all the commands C1 to C64 for selecting a command to be executed. Therefore, the time required to scan the 64 commands is equal to $64 \times 1/128$ turn = $1/2$ turn.

FIG. 6 is a bar graph for showing the execution waiting times of the commands C1 to C64. In the figure, the time required to scan the 64 commands C1 to C64 ($1/2$ turn) is also shown. Since a command with an execution waiting time shorter than the scanning time cannot be selected, a command with an execution waiting time which is equal to or longer than the scanning time and the shortest among all the commands is suitable as a next-to-be-executed command. As is clear from FIG. 6, the command C48 with the execution waiting time of a $1/2$ ($32/64$) turn will be selected as the next-to-be-executed command. Therefore, after reordering, the command C48 will be placed on the top of the queue as shown in FIG. 5, which means that a command with an execution waiting time four times as long as that for the case where eight commands are held in a queue will be selected.

To solve this problem, the process is performed on an additional condition that no subsequent scanning should be done if any command with an execution waiting time shorter than, for example, a ¼ turn (reference time) is found. This case will be described below with reference to FIGS. 7 and 8.

As shown in FIG. 7, it is assumed that a queue holds 64 commands C1 to C64 before reordering. The execution waiting time of each command is as shown in the figure but in this case, it is not necessary to calculate the execution waiting times of all the commands C1 to C64 for reordering.

According to the precondition described above, scanning an average of 16 commands among the 64 commands held in the queue may allow for extraction of a command with an execution waiting time shorter than a ¼ turn (reference time). The time required to scan the 16 commands (scanning time) is equal to 16×1/128 turn=⅛ turn.

FIG. 8 is a bar graph for showing the execution waiting times of the commands C1 to C64. In the graph, the scanning time and the reference time are also shown. Since the scanning time is a ⅛ (8/64) turn, commands with an execution waiting time which is equal to or longer than a ⅛ turn and equal to or shorter than the reference time of a ¼ (16/64) turn may be extracted. If, among these commands, the command C8 with the execution waiting time of 9/64 is extracted first, the command C8 will be selected as a next-to-be-executed command. Then the calculation of execution waiting times for the subsequent commands C9, C10, . . . will be aborted. In this way, even if 64 commands are held in a queue, a command with an execution waiting time equal to or twice as long as that for the case where eight commands are held in a queue can be selected by establishing the reference time.

The present invention is characterized in that a reference time is introduced for reordering commands held in a queue as described above. The present invention is applicable to a data storage unit comprising a read/write head for performing write processing or read processing based on write or read commands issued from the outside; a disk-shaped storage medium in which write data is stored through the write processing by the read/write head and from which read data is read out through the read processing; order holding means for holding the write and/or read order for the commands to be executed on the disk-shaped storage medium; and command selection means for selecting a next-to-be-executed command from among the commands held in the order holding means. The present invention is characterized in that, in the data storage unit, the command selection means selects a command with an execution waiting time shorter than a predetermined reference time as a next-to-be-executed command. For this purpose, the execution waiting time of a command to be selected is assumed to be equal to or longer than the above-mentioned scanning time. The scanning time can be established from the reference time as described above.

In the data storage unit according to the present invention, the command selection means can select a command held in a command queue as a next-to-be-executed command by calculating the execution waiting time thereof with a previously selected command taken as a base point and by comparing it with a predetermined reference time.

The command selection means according to the present invention aborts the calculation of execution waiting times for selecting a next-to-be-executed command, after the command with an execution waiting time shorter than the predetermined reference time is selected as the next-to-be-executed command. This is intended to avoid a situation where a longer scanning time may prevent selection of a command with a short execution waiting time.

It is desirable that when the number of commands held in the order holding means is greater than or equal to a predetermined number, the command selection means according to the present invention selects the command with an execution waiting time shorter than the predetermined reference time as the next-to-be-executed command. This is because more commands held in the order holding means may make it more effective to introduce the reference time.

Furthermore, when the number of commands held in the order holding means is greater than or equal to a predetermined number, the command selection means according to the present invention can select the command with an execution waiting time shorter than the predetermined reference time as the next-to-be-executed command and then select another command held in the order holding means as a further next-to-be-executed command by calculating its execution waiting time with the selected command taken as a base point and by comparing it with a predetermined reference time.

According to the present invention, the above-mentioned step of selecting a further next-to-be-executed command may be performed separately. Therefore, the present invention provides a data storage unit comprising a read/write head for performing write processing or read processing based on write or read commands issued from the outside; a disk-shaped storage medium in which write data is stored through the write processing by the read/write head and from which read data is read out through the read processing; order holding means for holding the write and/or read commands with order to be executed on the disk-shaped storage medium; and command selection means for selecting a next-to-be-executed command from among the commands held in the order holding means; wherein, when the number of commands held in the order holding means is greater than or equal to a predetermined number, the command selection means selects a first next-to-be-executed command and then selects a second command to be executed subsequent to the first command regardless of whether a command selected prior to the first command has been executed.

When the number of commands held in the order holding means is less than the predetermined number, the data storage unit according to the present invention can select a second command to be executed subsequent to the first next-to-be-executed command after it selects the first command and the command selected prior to the first command has been executed.

According to the present invention, when selecting a next-to-be-executed command from among write and/or read commands queued in a command queue on a data storage unit having a disk-shaped storage medium, the step of obtaining an execution waiting time of a predetermined command queued in the command queue and the step of determining whether the obtained execution waiting time satisfies predetermined timing conditions are performed first.

Next, when it is determined that the obtained execution waiting time satisfies the predetermined timing conditions, the step of selecting as a next-to-be-executed command the predetermined command which satisfies the predetermined timing conditions is performed. When it is determined, however, that the obtained execution waiting time does not satisfy predetermined timing conditions, the step of obtaining an execution waiting time of a command other than the predetermined command is performed. Then the step of determining whether the obtained execution waiting time satisfies predetermined timing conditions may be performed.

The present invention uses the command selection technique described above and provides a data processing method of executing on a storage medium via a read/write head write and/or read commands which are issued from a host and queued in a command queue. In essence, the processing method comprises a command selection step of determining in sequence whether the commands queued in the command queue can be executed in a predetermined reference time and selecting a command as a next-to-be-executed command when it is determined that the command can be executed in the predetermined reference time. The method further comprises a command execution step of executing an operation for writing data into the storage medium or reading data from the storage medium based on the command selected in the command selection step.

In the data processing method according to the present invention, the command selection step should be performed before any precedent command selected prior to the next-to-be-executed command has been executed. Furthermore, in the command selection step, it is determined in sequence whether the commands queued in the command queue in order of issue from the host can be executed in the predetermined reference time.

DETAILED DESCRIPTION OF THE INVENTION

Now, an embodiment of the present invention will be described below in detail, taking a hard disk drive as an example.

Figure 1:
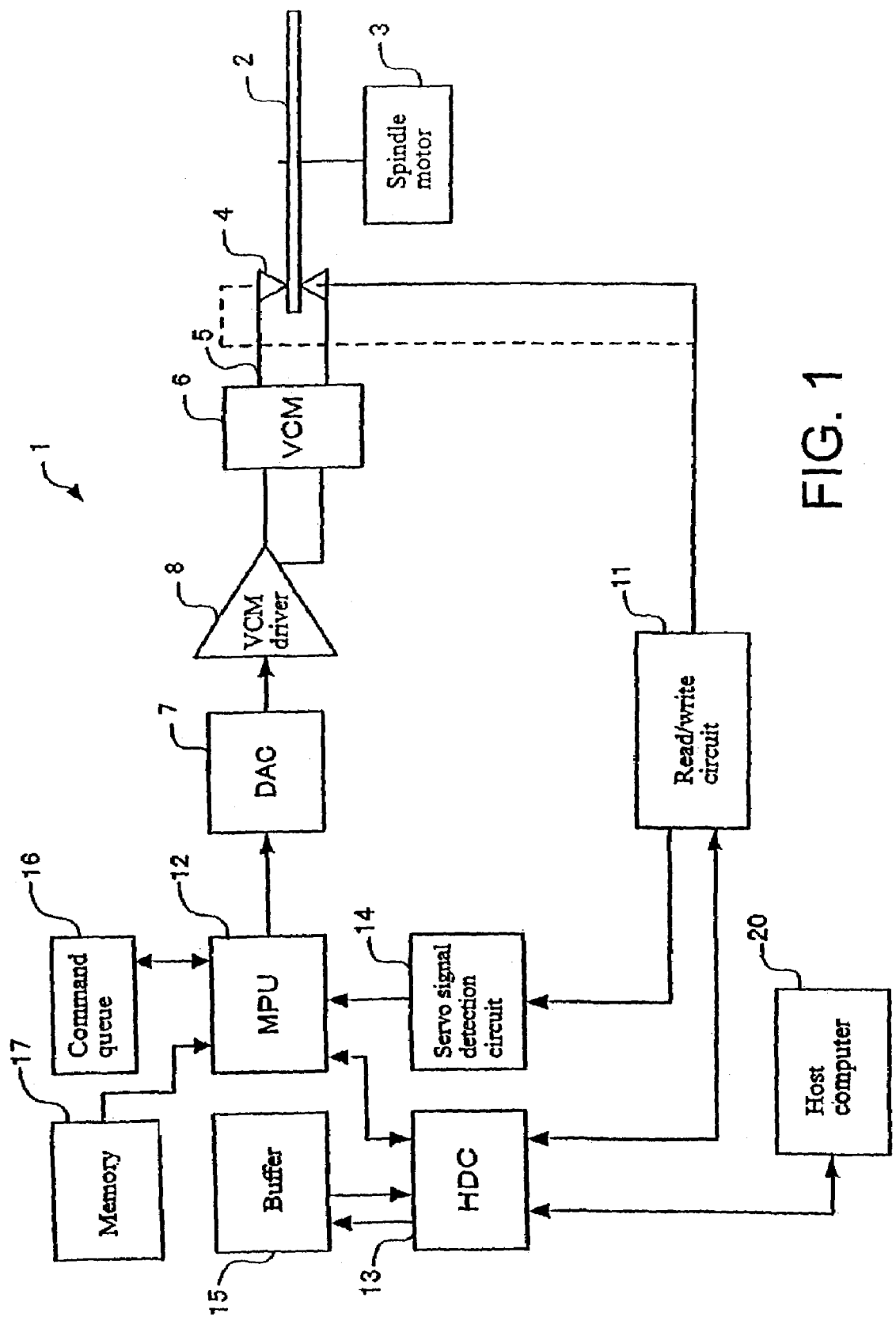
FIG. 1 is a block diagram for showing the basic configuration of a hard disk drive according to the embodiment.

FIG. 1 is a block diagram for showing the major components of a hard disk drive 1 according to the embodiment. The hard disk drive 1 is a data storage/regeneration unit in which a magnetic head 4 seeks and stays at a predetermined track (location) on a magnetic disk 2 rotationally driven by a spindle motor 3 for writing data on the magnetic disk 2 or for reading data from the magnetic disk 2. One or more magnetic disks 2 may be mounted as required and by way of example, the embodiment uses a single magnetic disk 2.

The magnetic disk 2 is rotationally driven on a spindle shaft of the spindle motor 3 when the hard disk drive 1 is operational and the magnetic disk 2 stops rotating (comes to rest) when the hard disk drive 1 is nonoperational. The surface of the magnetic disk 2 includes annual-ring-like tracks and each track includes radially partitioned sectors, each of which is a minimum unit for recording data. The size of a sector is usually 512 bytes. On the surface of the magnetic disk 2, a plurality of location information (servo information) storage regions are radially formed along the direction of the radius of the magnetic disk 2 and data storage regions are formed in the remaining area. Reading the servo information through the magnetic head 4 can allow for locating the magnetic head 4.

There are two magnetic heads 4 provided on the tip of an actuator 5, each magnetic head 4 corresponding to either of the front or back side of the magnetic disk 2. Each of the magnetic heads 4 performs data write and read operations on the magnetic disk 2. It also reads out the servo information stored on the magnetic disk 2. The magnetic head 4 is integral with the actuator 5 to move in the direction of the radius of the magnetic disk 2. A ramp (not shown) is provided outside the magnetic disk 2 to withdraw a nonoperational magnetic head 4.

A read/write circuit 11 performs data read/write processing. Namely, it converts write data issued from a host computer 20 through a hard disk controller (HDC) 13 into a write signal (electric current) and then supplies it to the magnetic head 4. The magnetic head 4 writes the data on the magnetic disk 2 based on the write current. On the other hand, the read/write circuit 11 converts a read signal (electric current) read from the magnetic disk 2 into digital data and then provides it to the host computer 20 through the HDC 13.

A servo signal detection circuit 14 extracts servo information from the read data provided by the read/write circuit 11. As described above, the servo information contains track identification data and burst patterns. The servo signal detection circuit 14 transfers the extracted servo information to a micro processing unit (MPU) 12.

The actuator 5 is driven by a voice coil motor (VCM) 6. The VCM 6 consists of a rotor composed of a coil and a stator composed of a permanent magnet and a predetermined current is supplied by a VCM driver 8 to the coil to drive the rotor so that the magnetic head 4 moves to or stops at a predetermined location on the magnetic disk 2.

The hard disk controller (HDC) 13 has the functions as an interface for the hard disk drive 1. One of the functions is to receive a write or read command issued from the host computer 20 as well as to issue the received write or read command to a buffer 15. Since a write command contains write data, it is hereinafter referred to as write data as appropriate.

Based on instructions from the MPU 12, a write or read command temporarily stored in the buffer 15 is read out by the HDC 13 and issued to the read/write circuit 11.

A command queue 16 holds a write command stored in the buffer 15 or the execution order of that write command. The execution order is determined by the MPU 12 and the HDC 13. Write or read commands stored in the buffer 15 are in sequence executed in the execution order held in the command queue 16 for writing or reading data on the magnetic disk 2.

The MPU 12 cooperates with the HDC 13 to control the hard disk drive 1. The MPU 12 interprets and executes a program stored in a memory 17. This program also includes a program for reordering the command queue 16 as described later. The MPU 12 determines the location of the magnetic head 4 based on the servo information transferred from the servo signal detection circuit 14 and produces a positioning control current for the magnetic head 4 based on a difference between the determined location of the magnetic head 4 and a target location to provide it to a digital/analog converter (DAC) 7.

The DAC 7 converts the positioning control current provided by the MPU 12 into an analog signal (voltage signal) and provides it to the VCM driver 8.

The VCM driver 8 converts the voltage signal received from the DAC 7 into a drive current and supplies it to the VCM 6.

Next, a typical reordering operation in the hard disk drive 1 will be described below with reference to a flow chart shown in FIG. 2.

Figure 2:
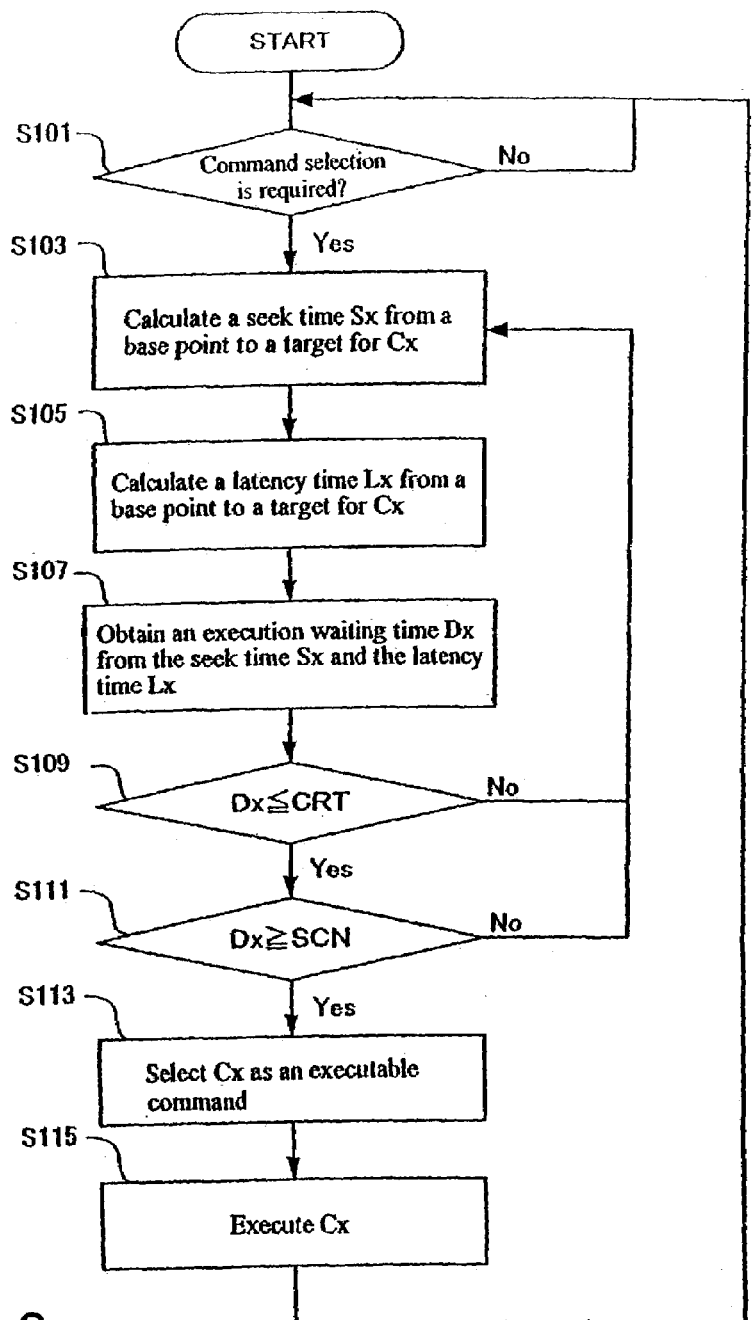
FIG. 2 is a flow chart for showing a reordering procedure for the hard disk drive according to the embodiment.
Figure 3:
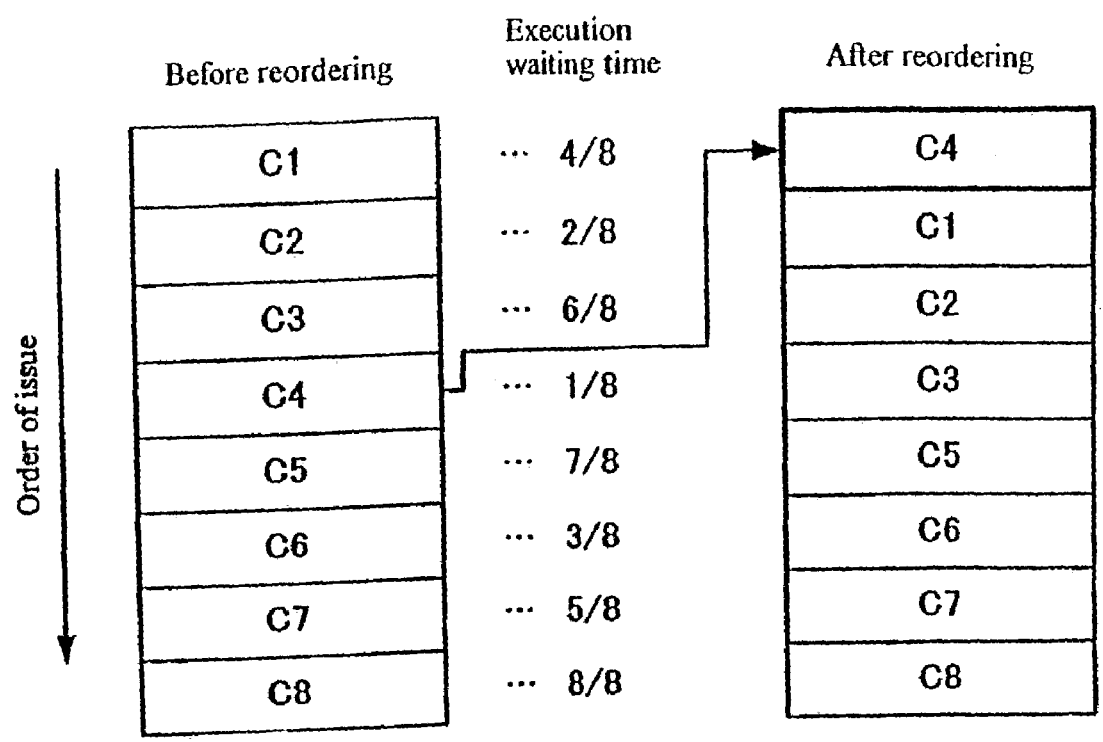
FIG. 3 is an explanatory drawing for a prior reordering technique.
Figure 4:
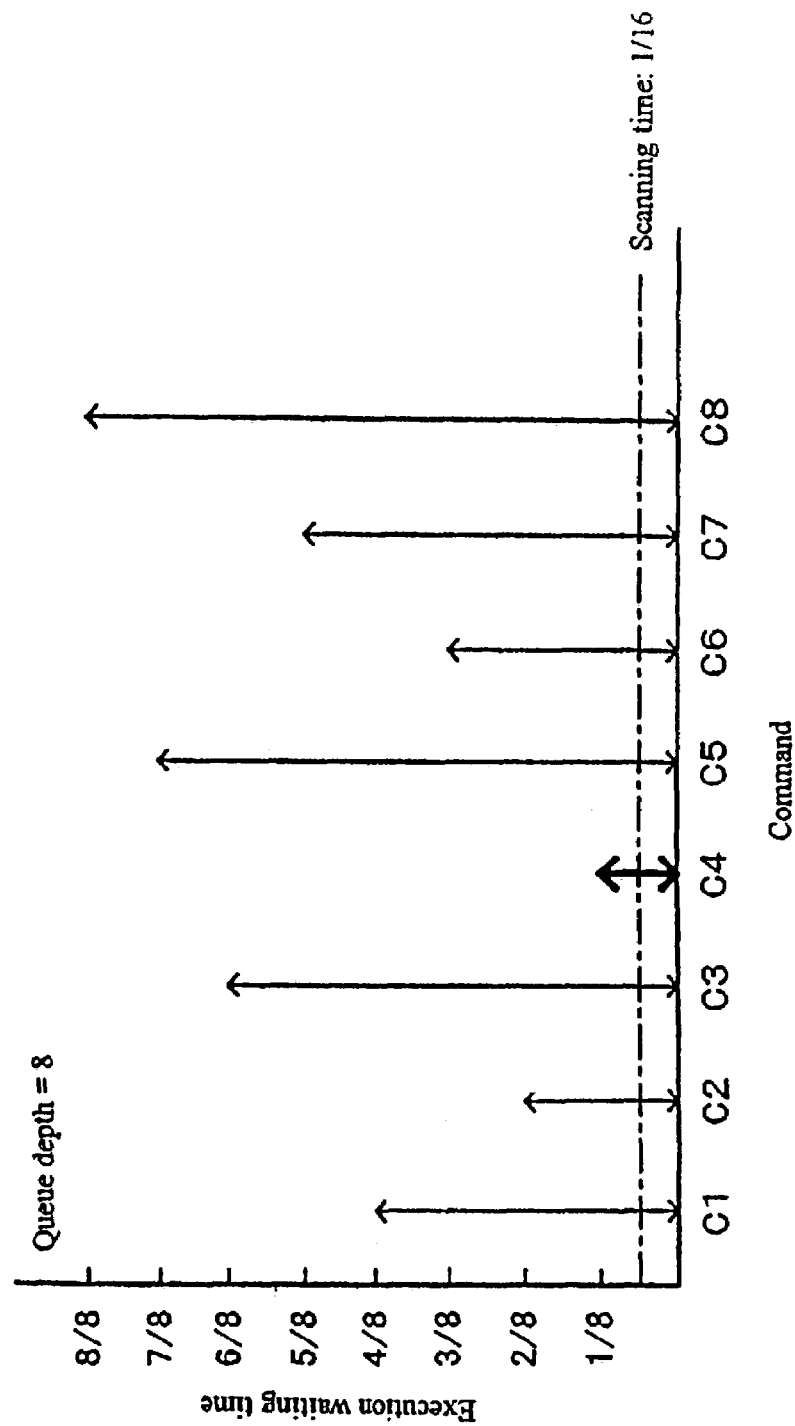
FIG. 4 is an explanatory drawing for a prior reordering technique.
Figure 5:
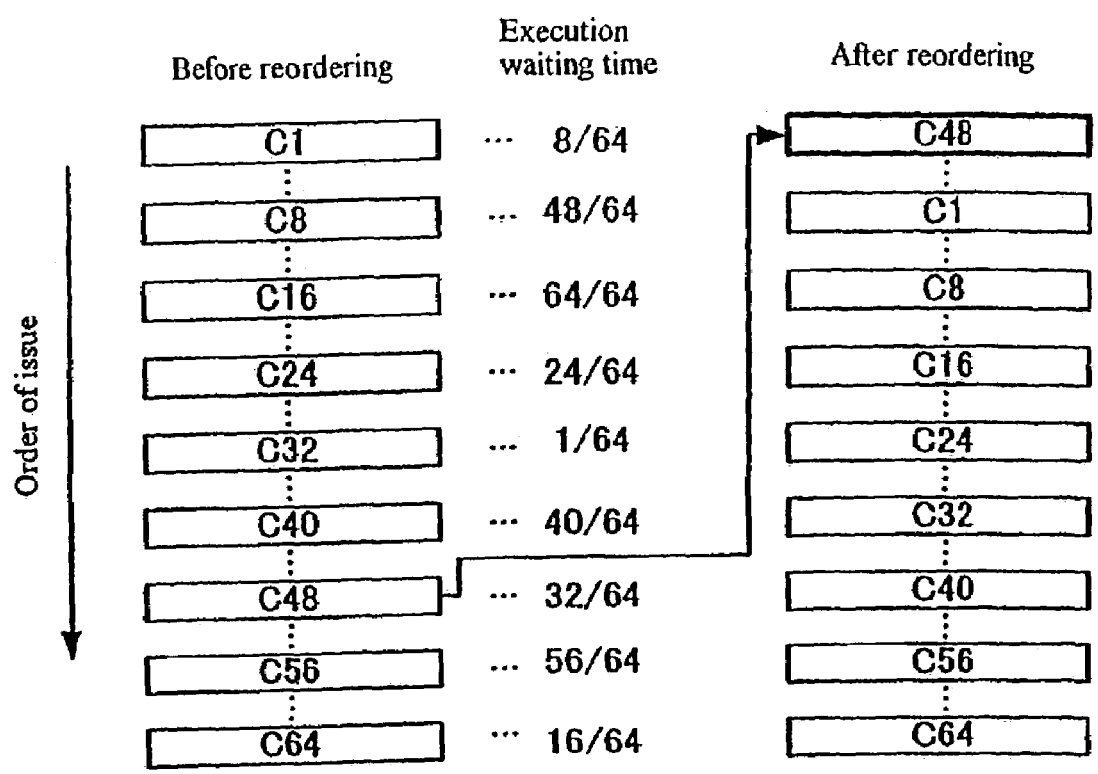
FIG. 5 is an explanatory drawing for a prior reordering technique.
Figure 6:
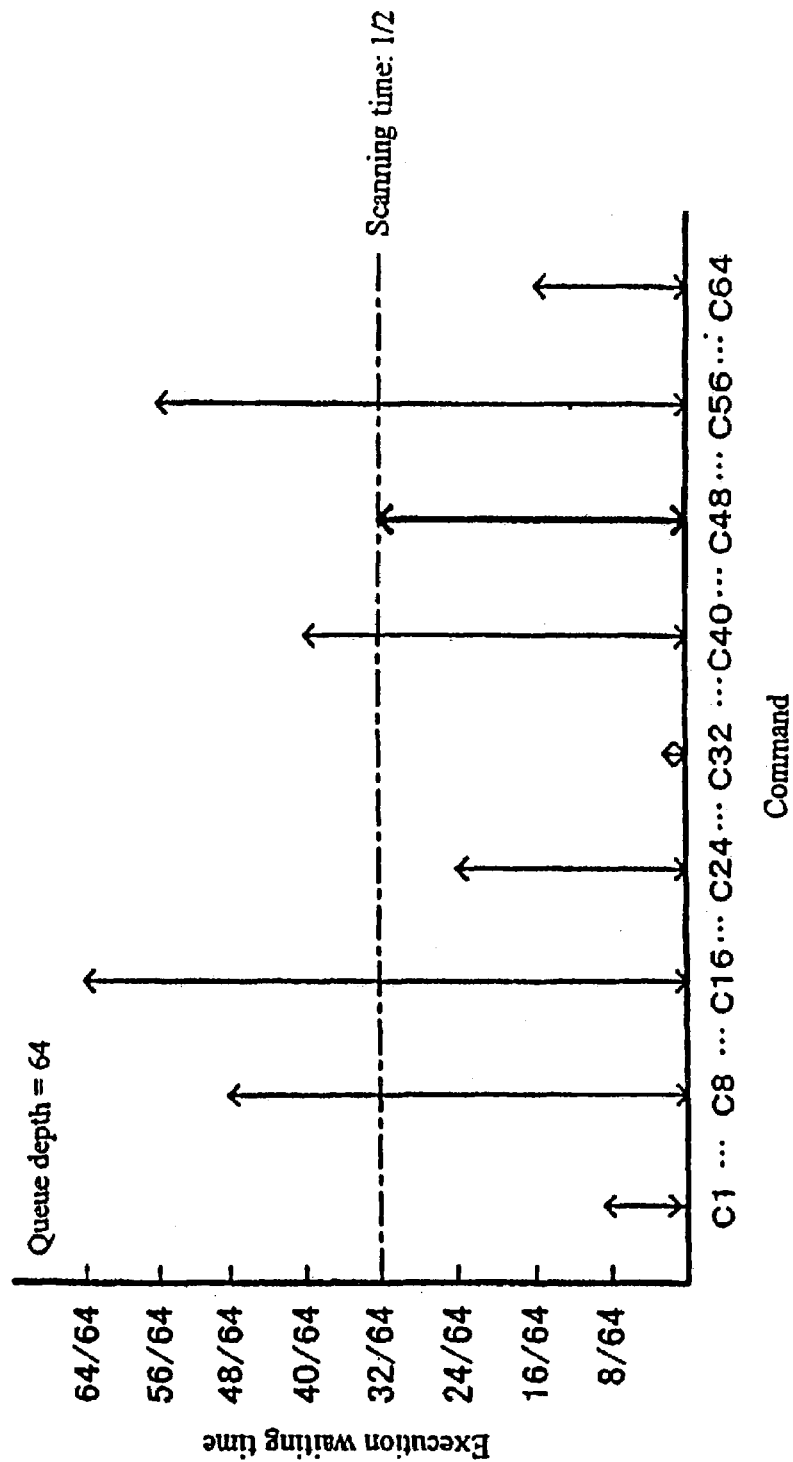
FIG. 6 is an explanatory drawing for a prior reordering technique.

In FIG. 2, it is first determined whether command selection is required (S101 in FIG. 2). Under instructions from the MPU 12, this determination is made by the HDC 13 based on the command storage status in the buffer 15. If there is no command waiting for execution, command selection is required. However, as described later, even if some commands are waiting for execution, it may be determined that command selection is required, depending on the number of commands held in the command queue 16.

When it is determined that command selection is required, the MPU 12 calculates a seek time Sx from a base point to a target for a predetermined command Cx (S103 in FIG. 2). The term "base point" used herein refers to a location where a write or read operation is performed on the magnetic disk 2 under a previously selected command Cx-1 and, more specifically, refers to the last sector where the write or read operation is performed. The term "target" refers to the start sector where a write or read operation is performed on the magnetic disk 2 under a command Cx.

Next, the MPU 12 calculates a sector distance from a base point to a target for the command Cx and this sector distance is called a latency time Lx (S105 in FIG. 2).

Then the MPU 12 obtains an execution waiting time Dx based on the calculated seek time Sx and latency time Lx (S107 in FIG. 2). Specifically, it operates as described below. First, if the latency time Lx is equal to or greater than the previously calculated seek time Sx, it means that the magnetic head 4 can perform a seek in time and thus, the calculated sector distance is used as an execution waiting time Dx. On the other hand, if the latency time Lx is smaller than the seek time Sx, it means that the magnetic head 4 can not perform a seek in time and thus a latency time Lx of one turn is added to the calculated sector distance to produce an execution waiting time Dx.

Next, the MPU 12 determines whether the obtained execution waiting time Dx is equal to or smaller than a predetermined reference time CRT (S109 in FIG. 2). If the execution waiting time Dx is equal to or smaller than the predetermined reference time CRT, it is further determined whether the execution waiting time Dx is equal to or greater than a scanning time SCN (S111 in FIG. 2). The scanning time is determined from the reference time CRT as described later. If the execution waiting time Dx is equal to or greater than the scanning time SCN, the command Cx is selected as a command to be executed (S113 in FIG. 2) and subsequent calculation of execution waiting times for commands held in the command queue 16 is aborted in the current command selection operation. The selected command Cx will be executed timely, that is, data write to the magnetic disk 2 or data read from the magnetic disk 2 will be performed (S115 in FIG. 2).

If the execution waiting time Dx exceeds the predetermined reference time CRT (S109 in FIG. 2) or if the execution waiting time Dx is smaller than the scanning time SCN (S111 in FIG. 2), the process returns to S 103 and then the steps S103 to S111 are performed on another command Cx+1 held in the command queue 16.

Figure 7:
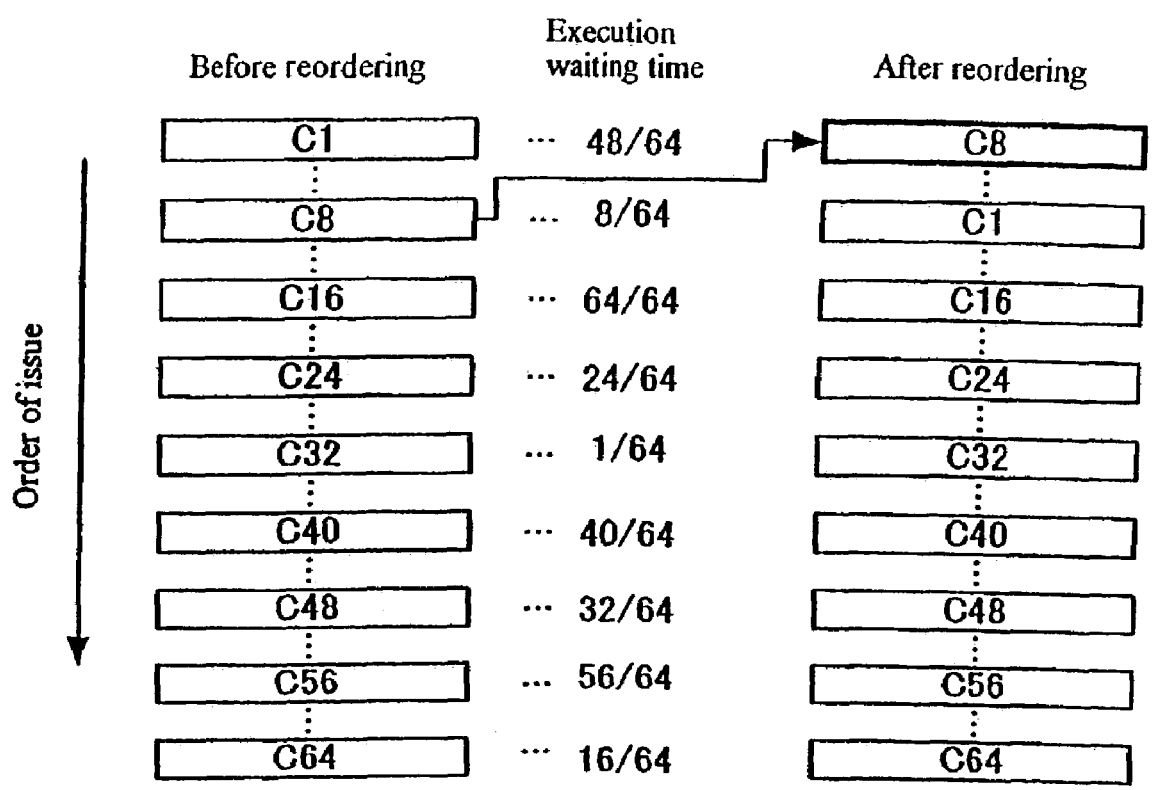
FIG. 7 is an explanatory drawing for a reordering technique according to the present invention.
Figure 8:
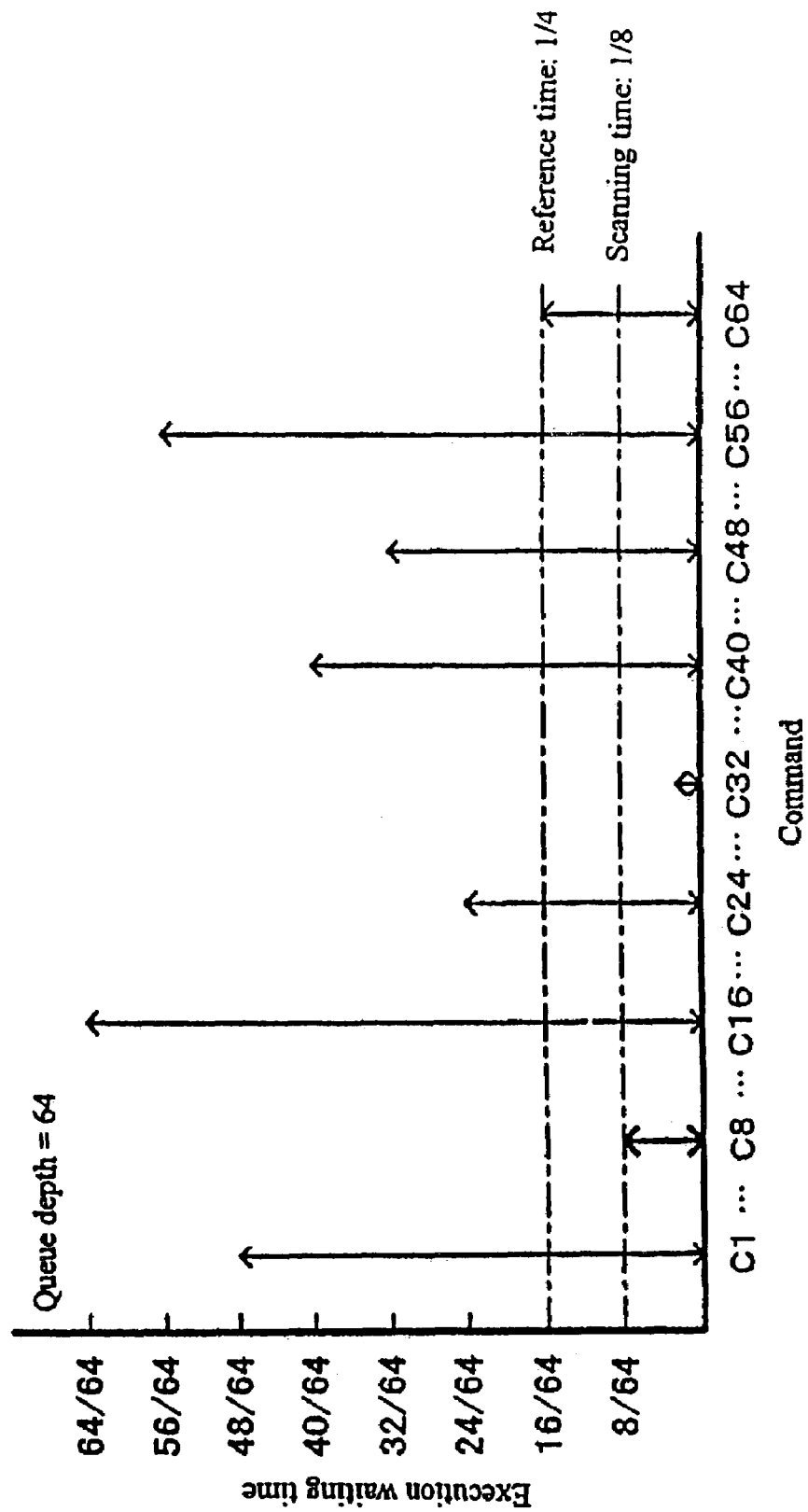
FIG. 8 is an explanatory drawing for a reordering technique according to the present invention.

The above-mentioned process of FIG. 2 will be further described below on the assumption that it is performed on the command queue 16 shown in FIG. 7. The reference time in FIG. 7 is equal to a ¼ turn.

First, if it is determined that command selection is required because there is no command waiting for execution, the steps S103 to S107 in FIG. 2 are performed on a command C1 which is the first in order of issue to the command queue 16. Since the execution waiting time D1 of the command C1 is equal to a $48/64$ turn, it exceeds the reference time CRT of a ¼ turn (S109 in FIG. 2). Then the steps S103 to S107 in FIG. 2 are performed on the next command C2 and subsequent commands. It is assumed that, like the command C1, the execution waiting times D2 to D7 of the commands C2 to C7 exceed the reference time CRT of a ¼ turn. Since the execution waiting time D8 of the command C8 is equal to an $8/64$ (⅛) turn, it satisfies the determination requirements of S109 in FIG. 2. The execution waiting time D8 of the command C8 is also equal to or greater than the scanning time SCN (S111 in FIG. 2). Therefore, the command C8 is selected as a next-to-be-executed command and thus the command C8 will be executed prior to the command C1 as shown in the column "After reordering" in FIG. 7. This selection of the command C8 is performed before a previously selected command, for example, command C0 has been executed. In addition, the steps S103 to S107 will be performed on the command C9 and subsequent commands.

If 64 commands are held in the command queue, commands with execution waiting times shorter than a ¼ turn (reference time) can be extracted at the point of time when an average of 16 commands are scanned. Therefore, in this case, the scanning time SCN can be defined as a time required to scan 16 commands, that is, $16 \times 1/128$ turn=⅛ turn.

Figure 9:
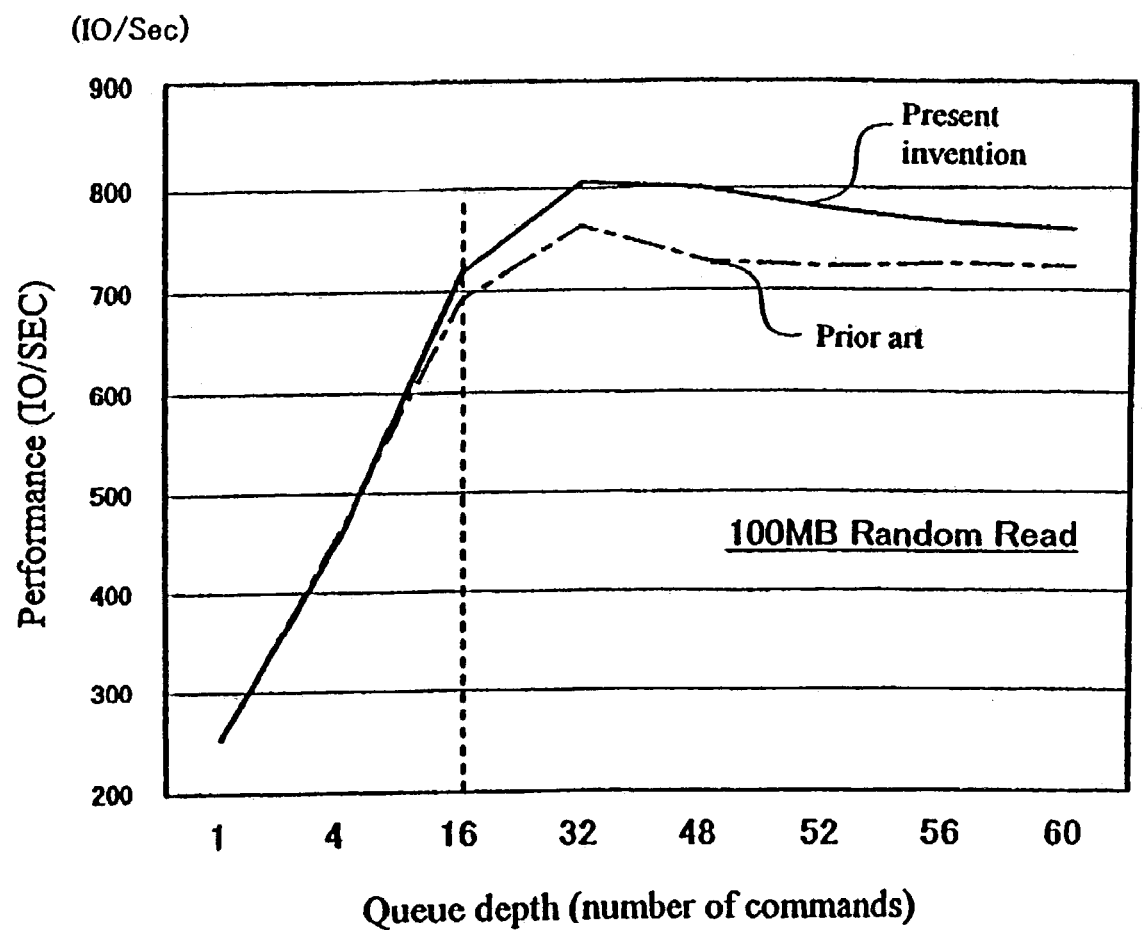
FIG. 9 is a graph for showing the effect of improving the performance according to the present invention.

FIG. 9 is a graph for showing the effect produced by applying the reordering method according to the embodiment. In this graph, the vertical axis indicates the performance (IO/SEC: the number of data write and/or read operations per second) and the horizontal axis indicates the depth of the command queue 16. As shown in FIG. 9, it can be appreciated that, when the depth of the command queue 16 exceeds 16, the performance for the case where the reordering method according to the embodiment is applied can be improved remarkably as compared with that for the case where the prior reordering method is applied.

Figure 10:
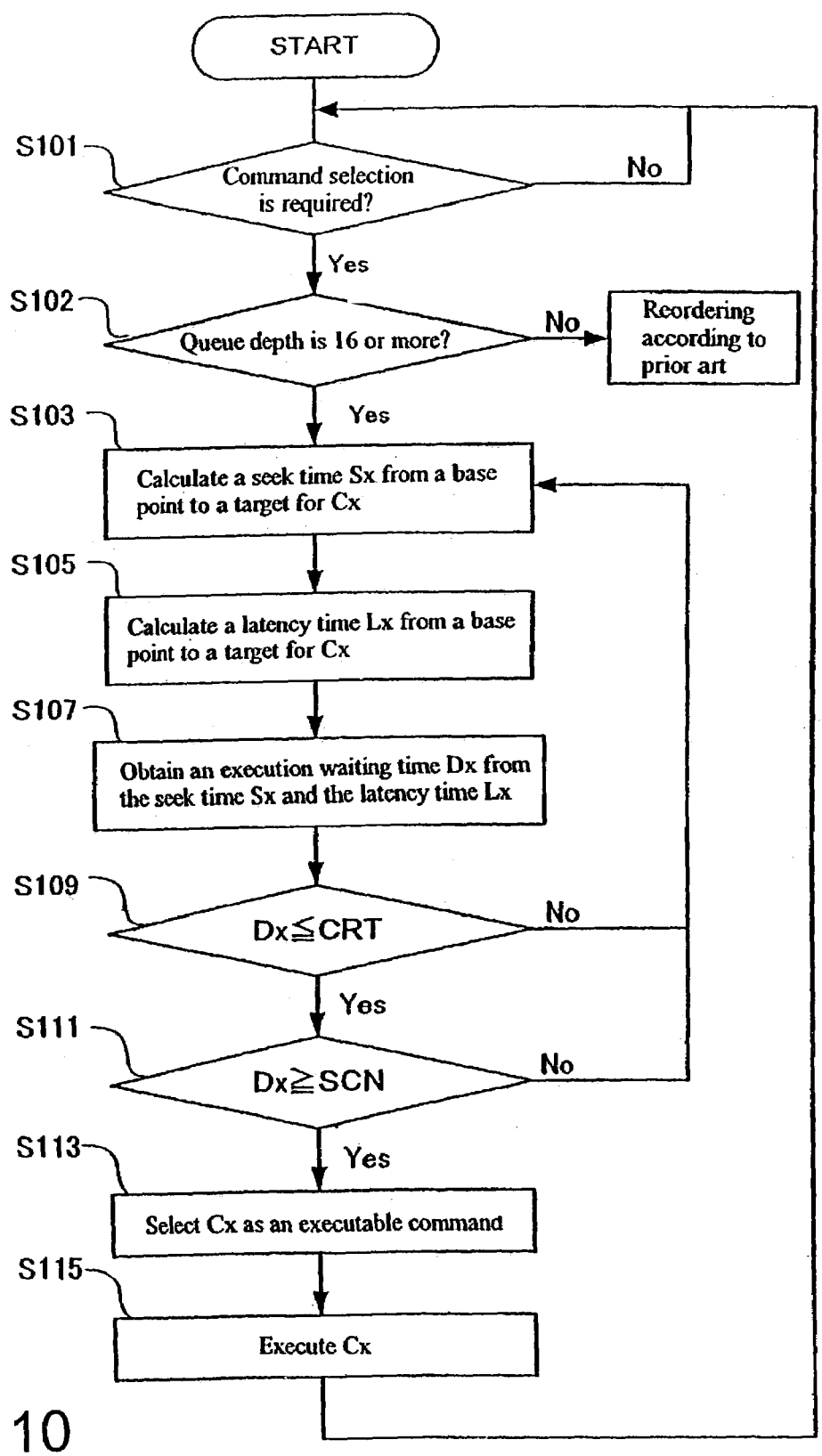
FIG. 10 is a flow chart for showing a variation of the reordering procedure according to the embodiment.

The prior reordering method is a method wherein execution waiting times of all commands held in the command queue 16 are calculated to select an executable command with the shortest execution waiting time among all the commands as a next-to-be-executed command. If the depth of the command queue 16 is smaller than 16, however, there may be no difference in performance between the embodiment and the prior technique. Therefore, for example, as shown in FIG. 10, the above-mentioned embodiment may be modified as follows: it is determined whether the depth of the command queue 16 is equal to or greater than 16 in S102, the process proceeds to S103 if the depth is equal to or greater than 16, and otherwise the prior reordering method is applied. A depth 16 of the command queue 16 is merely illustrative and the present invention can permit other values for the depth.

Figure 11:
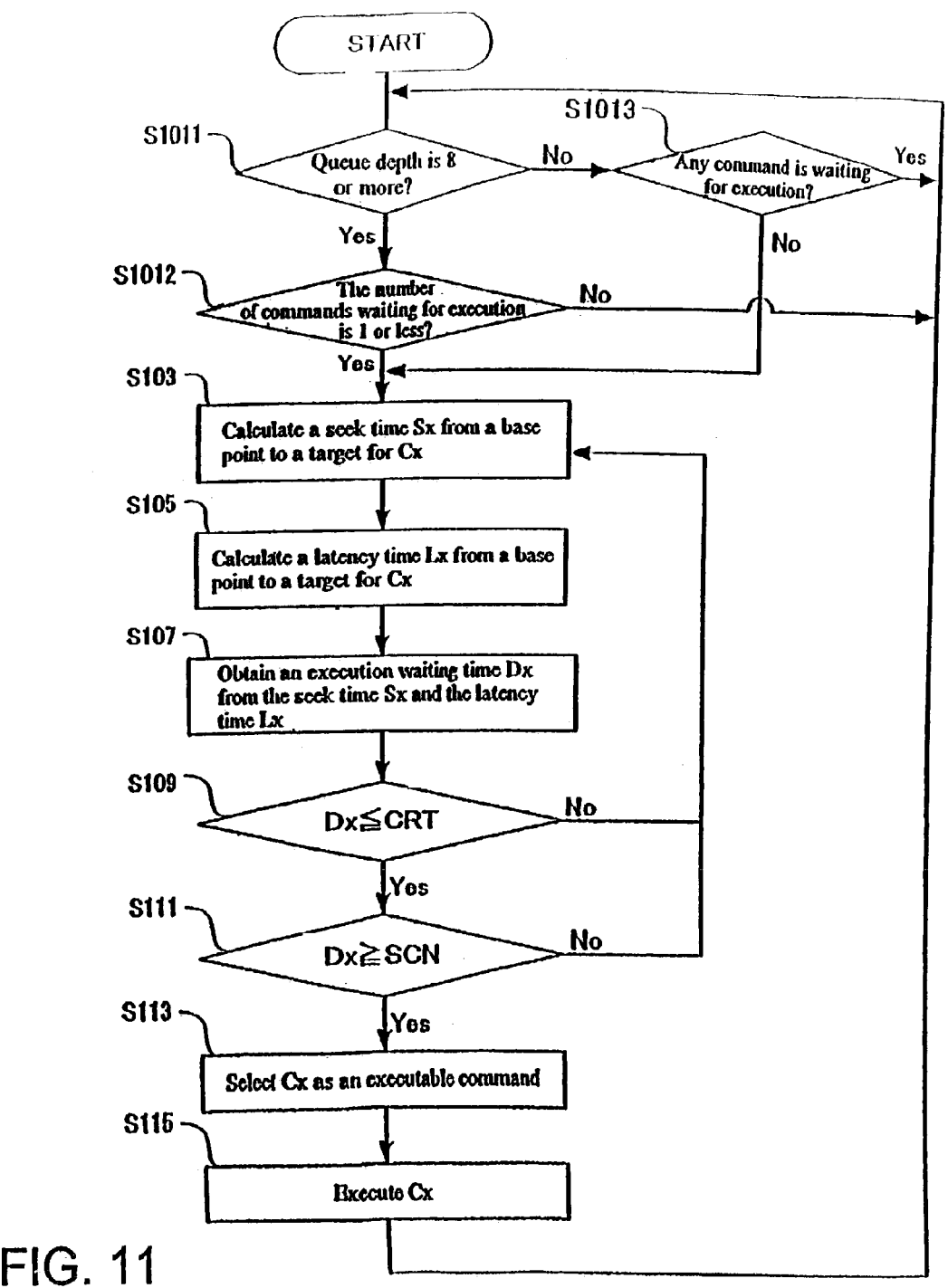
FIG. 11 is a flow chart for showing a variation of the reordering procedure according to the embodiment.

As described above for S101, according to the present invention, even if some commands are waiting for execution, it may be determined that command selection is required, depending on the number of commands held in the command queue 16. For example, as shown in FIG. 11, it is determined whether the depth of the command queue 16 is equal to or smaller than 8 (S101 in FIG. 1). If the depth is equal to or greater than 8, the process proceeds to S103 and subsequent steps when the number of commands waiting for execution is 0 or 1 (S1012 in FIG. 11). If the depth of the command queue 16 does not exceed 8, the process does not proceed to S103 when some commands are waiting for execution and the process proceeds to S103 only when no command is waiting for execution (S1013 in FIG. 11).

In the above-mentioned procedure, when the number of commands held in the command queue 16 is greater than or equal to a predetermined number, a command with an execution waiting time shorter than a reference time is selected as a next-to-be-executed command, and then another command held in the command queue 16 is selected as a further next-to-be-executed command by calculating its execution waiting time with the selected command taken as a base point and by comparing it with a predetermined reference time.

Since commands are in sequence issued from the host computer 20, command selection for reordering should be limited to only one command. This is because it may be likely that a newly issued command has an execution waiting time shorter than that of a previously issued command. However, if a certain number of commands are held in the command queue 16, it may be less probable that a newly issued command has the shortest execution waiting time. Therefore, it may be less necessary to limit such command selection for reordering to one command. For these reasons, the above-mentioned embodiment uses the depth 8 of the command queue 16 as a reference and for deeper queues, up to two commands may be selected.

As described above, the data storage unit according to the present invention can be very effective in improving the performance, particularly, for deeper command queues by virtue of the novel reordering method.

What is claimed is:

1. A data storage unit, comprising:
a storage medium configured to store data;
a read/write head configured to read data from, and write data to, the storage medium in response to read/write commands;
a command queue configured to temporarily store read/write commands issued for the storage medium, wherein the number of commands in the command queue is greater than eight; and
a command selection module configured to sequentially determine execution waiting times for commands stored in the command queue and to select a next-to-be-executed command from among the commands stored in the command queue in response to a determination that an execution waiting time for the command is less than a predetermined reference time, wherein the predetermined reference time comprises a fixed time that remains unchanged.

2. The data storage unit of claim 1, wherein the command selection module is configured to select a first command in the command queue with an execution waiting time less than the predetermined reference time and stop determining execution waiting times for commands in response to selection of the first command.

3. The data storage unit of claim 1, wherein the command selection module is configured to select a second read/write command to be executed subsequent to the first read/write command, the second read/write command having an execution wait time shorter than a predetermined reference time, the execution wait time of the second read/write command determined using the first read/write command as a base point.

4. The data storage unit of claim 3, wherein the second read/write command is selected prior to execution of the first read/write command in response to the number of commands in the command queue being less than a predetermined number.

5. The data storage unit of claim 3, wherein the second read/write command is selected after the first read/write command is executed in response to the number of commands in the command queue being less than a predetermined number.

6. The data storage unit of claim 1, wherein the command selection module is configured to determine whether the execution wait time for the first read/write command is greater than a predetermined scanning time.

7. The data storage unit of claim 1, wherein the number of commands in the command queue exceeds a predetermined number.

8. The data storage unit of claim 1, wherein the command selection module is configured to select a next-to-be-executed command before a current command has finished execution.

9. A controller for a data storage unit comprising:
a command queue configured to temporarily store read/write commands issued for a storage medium, wherein the number of commands in the command queue is greater than eight; and
a command selection module configured to sequentially determine execution waiting times for commands stored in the command queue and to select a next-to-be-executed command from among the commands stored in the command queue in response to a determination that an execution waiting time for the command is less than a predetermined reference time, wherein the predetermined reference time comprises a fixed time that remains unchanged.

10. The controller of claim 9, wherein the command selection module is configured to select a first command in the command queue with an execution waiting time less than the predetermined reference time and stop determining execution waiting times for commands in response to selection of the first command.

11. The controller of claim 10, wherein the number of commands in the command queue exceeds a predetermined number.

12. A data storage system comprising:
a host configured to issue read/write commands;
a disk-shaped storage medium in communication with the host, the storage medium configured to store data;
a read/write head in communication with the storage medium, the read/write head configured to read data from, and write data to, the storage medium in response to read/write commands;
a command queue configured to temporarily store read/write commands in the same order as the commands are issued from the host, wherein the number of commands in the command queue is greater than eight; and a command selection module configured to sequentially determine execution waiting times for commands stored in the command queue and to select a next-to-be-executed command from among the commands stored in the command queue in response to a determination that an execution waiting time for the command is less than a predetermined reference time, wherein the predetermined reference time comprises a fixed time that remains unchanged.

13. The system of claim 12, wherein the command selection module is configured to select a first command in the command queue with an execution waiting time less than the predetermined reference time and stop determining execution waiting times for commands in response to selection of the first command.

14. The system of claim 12, wherein the reference time comprises the time required for the disk-shaped storage medium to complete a quarter turn.

15. A method for selecting a read/write command for execution within a data storage device, the method comprising:

sequentially determining execution wait times for a plurality of read/write commands within a command queue for the data storage device, wherein the number of commands in the command queue is greater than eight;

selecting a first read/write command having an execution wait time shorter than a predetermined reference time as a next-to-be-executed command for the data storage device, wherein the predetermined reference time comprises a fixed time that remains unchanged; and selecting a first command in the command queue with an execution waiting time less than the predetermined reference time and stop determining execution waiting times for commands in response to selection of the first command.

16. The method of claim 15, further comprising selecting a second read/write command to be executed subsequent to the first read/write command, the second read/write command having an execution wait time shorter than a predetermined reference time, the execution wait time of the second read/write command determined using the first read/write command as a base point.

17. The method of claim 15, wherein in response to a determination that the number of commands in the command queue is less than a predetermined number, the second read/write command is selected prior to execution of the first read/write command.

18. The method of claim 15, further comprising determining whether the execution wait time for the first read/write command is greater than a predetermined scanning time.

19. The method of claim 15, further comprising selecting the first read/write command is selected prior to execution of a currently next-to-be-executed command.

20. An article of manufacture comprising a program storage medium readable by a processor and embodying one or more instructions executable by a processor to perform a method for selecting a read/write command for execution within a data storage device, the method comprising:

sequentially determining execution wait times for a plurality of read/write commands within a command queue for the data storage device, wherein the number of commands in the command queue is greater than eight;

selecting a first read/write command having an execution wait time shorter than a predetermined reference time as a next-to-be-executed command for the data storage device, wherein the predetermined reference time comprises a fixed time that remains unchanged; and selecting a first command in the command queue with an execution waiting time less than the predetermined reference time and stopping determining execution waiting times for commands in response to selection of the first command.

21. The article of manufacture of claim 20, wherein the method further comprises selecting a second read/write command having an execution wait time shorter than a predetermined reference time to be executed subsequent to the first read/write command, the execution wait time of the second read/write command determined using the first read/write command as a base point.

22. The article of manufacture of claim 20, wherein the method further comprises determining whether the execution wait time for the first read/write command is greater than a predetermined scanning time.

23. A data storage unit, comprising:

a read/write head for reading and writing data in response to read/write commands;

a storage medium configured to store data for reading and writing by the read/write head;

an order holding means for holding ordered read/write commands to be executed on the disk-shaped storage medium, wherein the number of commands in the order holding means is greater than eight;

a command selection means for selecting a next-to-be-executed command from among the commands in the order holding means, wherein the predetermined reference time comprises a fixed time that remains unchanged; and wherein the command selection means selects a command with an execution waiting time shorter than a predetermined reference time as a next-to-be-executed command.

24. The data storage unit of claim 23, wherein the command selection means selects a command held in the order holding means as a next-to-be-executed command by calculating the execution waiting time thereof with a previously selected command taken as a base point.

25. The data storage unit of claim 23, wherein the command selection means selects a first command in the order holding means with an execution waiting time shorter than a predetermined reference time and stops determining execution waiting times for commands in response to selection of the first command.

* * * * *